United States Patent
Mazzeo et al.

(10) Patent No.: US 9,775,490 B2
(45) Date of Patent: Oct. 3, 2017

(54) HARD SURFACE CLEANING ARTICLE COMPRISING AN ADHESIVE

(75) Inventors: Michele Mazzeo, Francavilla al Mare (IT); Italo Corzani, Chieti (IT); Rodrigo Rosati, Francavilla al Mare (IT); Fabio Cinelli, Pescara (IT); Antonello Colaianni, Pescara (IT); Fabio Ciammaichella, Pescara (IT); Alessandra Massa, Caramanico Terme (IT); Hugh Joseph O'Donnell, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 1742 days.

(21) Appl. No.: 11/498,370

(22) Filed: Aug. 3, 2006

(65) Prior Publication Data
US 2008/0032126 A1 Feb. 7, 2008

(30) Foreign Application Priority Data
Aug. 5, 2005 (EP) .................................... 05017142

(51) Int. Cl.
C09J 11/00 (2006.01)
A47L 25/00 (2006.01)
C09J 7/02 (2006.01)

(52) U.S. Cl.
CPC ........... *A47L 25/005* (2013.01); *C09J 7/0207* (2013.01); *Y10T 428/28* (2015.01); *Y10T 428/2813* (2015.01)

(58) Field of Classification Search
USPC ..................................................... 15/104.002
See application file for complete search history.

(56) References Cited

U.S. PATENT DOCUMENTS

| | | | |
|---|---|---|---|
| 3,682,690 A | | 8/1972 | Amos et al. |
| 4,391,853 A | * | 7/1983 | Pointon .......................... 427/152 |
| 5,352,516 A | * | 10/1994 | Therriault et al. ..... 428/355 CN |
| 6,270,875 B1 | * | 8/2001 | Nissing .......................... 428/138 |
| 6,550,092 B1 | * | 4/2003 | Brown et al. ............. 15/104.002 |
| 6,881,471 B2 | | 4/2005 | Toussant et al. |
| 2002/0050016 A1 | * | 5/2002 | Willman et al. ......... 15/104.002 |
| 2004/0266965 A1 | * | 12/2004 | Holguin et al. ............... 526/320 |

FOREIGN PATENT DOCUMENTS

WO WO 01/62132 A2 8/2001
WO WO 03/075735 A1 9/2003

OTHER PUBLICATIONS

D. Braun, H. Cherdron, H. Ritter, Polymer Synthesis: Theory and Practice, Copyright 2001, Springer-Verlag, 3rd Edition, pp. 87-90.*
PCT International Search Report dated Dec. 1, 2006, 5 pages.

* cited by examiner

*Primary Examiner* — Nicholas Kokkinos
(74) *Attorney, Agent, or Firm* — Larry L. Huston; Steven W. Miller

(57) ABSTRACT

The present invention relates to articles for cleaning hard surfaces and in particular to remove large particles and hairs from large surfaces. The articles comprise an adhesive having specific Theological properties that provide increased efficacy in capturing and trapping large particles and hairs.

17 Claims, No Drawings

HARD SURFACE CLEANING ARTICLE COMPRISING AN ADHESIVE

FIELD OF THE INVENTION

The present invention relates to an article for cleaning hard surfaces comprising an adhesive. The adhesive is able to quickly trap and retain dust, lint, hairs, sand, food crumbs, grass and the like. In particular, said adhesive is able to retain those particles and hairs which are normally not captured by usual articles not comprising an adhesive and which need to be collected with a vacuum cleaner or a broom. This is achieved by carefully selecting the chemical composition and rheological characteristics of the adhesive.

BACKGROUND OF THE INVENTION

Hard surface cleaning articles comprising an adhesive to retain particles and hairs are known in the art. For example PCT patent application WO 01/62132 by The Procter & Gamble Company describes cleaning sheets comprising an additive that enhances the pick up and retention of particulate material from surfaces, while minimizing the amount of residue left on the surface being cleaned. Adhesives are mentioned among the additives which can be used. The mentioned application also describes a cleaning implement comprising a mop head having a resilient bottom surface, a portion of which preferably has a substantially smooth curved profile or crown which engages a removable cleaning sheet. The application also describes how the adhesive can be applied to the cleaning sheet only in selected zones, in order to avoid excessive tackiness and preserve the ability of the cleaning sheet to smoothly glide across surfaces Patent application WO 03/075735 by 3M Company, describes a wipe for capturing ordinary dust or dirt and heavier particles such as sand that includes a wiping member having discrete valleys and peaks, and wherein an adhesive is provided in the valleys and not on the peaks. The adhesive can contact a surface sufficiently to pick up sand and other heavy particles, but not to so great a degree that the coefficient of friction between the wipe and the surface is unduly high, which can make wiping difficult.

Similarly to the 3M application, U.S. Pat. No. 6,550,092 from S. C. Johnson describes a cleaning sheet including a fabric layer with a plurality of cavities secured to a flexible backing layer so as to define an outer fabric surface with a plurality of cavities therein. The cavities can include a tacky bottom surface capable of enhancing the retention of dust and other particles. Cleaning implements and methods of cleaning surfaces using the cleaning sheet are also described.

The hard surface cleaning articles described in the prior art can be further improved, especially as concerns their efficiency in capturing and retaining particles and hairs.

Based on the above state of the art it is an objective of the present invention to provide hard surface cleaning articles having a better efficiency in capturing and retaining particles and hairs. It is another objective of the present invention to provide hard surface cleaning articles which are more effective in picking up large particles such as breadcrumbs and the like.

All cited prior art applications describe hard surface cleaning articles comprising generic adhesives. We have surprisingly found that by selecting a specific range of adhesive materials having peculiar Theological properties, hard surface cleaning articles can be obtained having an improved efficiency of particles/hairs pickup. This translates in a much easier handling of the article, in a faster cleaning action and also in more effective cleaning, including the ability of collecting bigger particles.

SUMMARY OF THE INVENTION

In one embodiment the present invention relates to a hard surface cleaning article comprising an adhesive having:
  a. An elastic modulus $G'_{25}$ measured at 25° C. and 0.1 rad/s below 15000 Pa, preferably below 10000 Pa, most preferably below 5000 Pa
  and
  b. An elastic modulus percent increase $\Delta G'_{25}$ measured between 0.1 and 100 rad/s of more than 100%, preferably more than 130%, more preferably more than 150%.

In another embodiment the present invention relates to a method of cleaning a hard surface which comprises contacting said surface with an article comprising an adhesive as described above.

A further embodiment of the present invention relates to the use of an article comprising an adhesive as described above, for cleaning a hard surface in order to remove more effectively big particles and hairs.

DETAILED DESCRIPTION OF THE INVENTION

The Adhesive

The characteristics which have been considered in this context are the elastic modulus G' describing the elastic behavior of the material and the viscous modulus G" which describes the viscous behavior of the adhesive material. G' and G" are measured in Pascal (Pa) and all values must specify the temperature (° C.) and the frequency (rad/s) at which it has been measured since both G' and G" can change significantly with these two parameters.

The viscous behavior of the adhesive can be interpreted to represent an indication of the ability of the adhesive to quickly attach and securely adhere. The elastic behavior can be interpreted as an indication of the "hardness" of the adhesive. Its value is also critical for good initial attachment. Their combination is believed to be an indicator of the required force upon removal. The ratio between viscous and elastic and modulus is considered to be an indication of which fraction of the removal energy will be dissipated within the adhesive and which fraction is available to trigger the actual removal.

In order to provide the desired properties of quickly adhere, embed and retain dirt particles the dynamic behavior of the elastic modulus at different frequencies, representative of the conditions in which the adhesive respectively adheres/embeds dirt particles and retains them, is of key importance. The ratio between the viscous modulus and the elastic modulus is important as well in order to further optimize the adhesive selection.

All rheological properties in the discussion below are measured at 25° C. since the adhesives in question are meant to be used in household cleaning articles and therefore the normal operating temperature is expected to be about 25° C. in most cases.

An adhesive to be used in the present invention has an elastic modulus $G'_{25}$ at a temperature of 25° C. and a viscous modulus $G''_{25}$ at a temperature of 25° C. of wherein each of these values is measured at a specified frequency in rad/s. The adhesive further has a dynamic elastic behavior expressed in terms of elastic modulus percent increase $\Delta G'_{25}$ which is defined in this case as the percent increase of $G'_{25}$ from a frequency of 0.1 rad/s to a frequency of 100 rad/s:

$$\Delta G'_{25} = \frac{G'_{25}(100\text{rad/s}) - G'_{25}(0.1\text{rad/s})}{G'_{25}(0.1\text{rad/s})} \times 100$$

The adhesive also has a "crossover frequency" which is defined as the frequency in rad/s at which the value of $G'_{25}$ is equal to $G''_{25}$.

The adhesive to be used in the present invention satisfies the following conditions.

$G'_{25}$ (0.1 rad/s) is below 15000 Pa
preferably below 10000 Pa,
most preferably below 5000 Pa.
and
$\Delta G'_{25}$ is higher than 100%
preferably higher than 130%
most preferably higher than 150%.

In a preferred embodiment, the adhesive to be used in the present invention also has a crossover frequency below 1000 rad/s, preferably below 700 rad/s most preferably below 500 rad/s.

It is in general preferred that the adhesives of the present invention are in the form of hot melt adhesives.

Provided the above rheological conditions are satisfied the adhesives will also preferably satisfy conditions such as sufficient cohesiveness (to prevent residue of adhesive on the treated surfaces) which are critical for commercial use of such adhesives and apparent to those skilled in the art.

Often the criteria of hygienic appearance and pleasant feel upon contact are important such that adhesive composition which are transparent or white, are preferred.

It was surprisingly found that hard surface cleaning articles comprising an adhesive as described above have an improved efficacy in trapping large particles and hairs.

While not whishing to be bound by theory, it is believed that adhesives work by two main mechanisms, i.e. 1) energetic interactions between the surface of the adhesive and the surface of the particle/substrate to be adhered (adherend) and 2) mechanical grafting or embedding by the adhesive of the particle/substrate to be adhered (adherend). When both mechanisms are possible the effectiveness of the adhesion achieves a maximum. For activating both mechanisms and for providing optimal conditions of bonding it is important that the adhesive is sufficiently soft—i.e. that it's absolute value of G' is sufficiently low—at the typical frequencies at which the bond formation occurs, e.g. between 0.01 and 1 rad/s.

Absolute low values of G' at this frequency range in fact allow both the establishment of a very intimate contact between the adhesive and the adherend—with activation of energetic interactions between the surfaces of the adhesive and the adherend—and favors also the mechanical grafting/embedding of the adherend. The lower is the value of G' the better is the activation of both these phenomena which fact leads to a strong adhesion. On the other side, adherends not only need to be bonded by the adhesive but they need also to be retained by it in a stable way, resisting as much as possible all external stresses that may lead to the break of the adhesive bond. Consequently, it is essential that the adhesive, while sufficiently soft in the conditions of bond formation—i.e. at low frequencies—is able to harden and resist possible breaks of the bond at higher frequencies, for examples 100 rad/s, which typically represent the conditions in which debonding occurs.

This ability of the adhesive of both forming excellent bonds and resisting debonding by hardening upon increase of frequency, is well expressed by the increase of its G' between a typical frequency of bonding—e.g. 0.1 rad/s—and a typical frequency of debonding—e.g. 100 rad/s.

While, as said, the absolute values and the dynamic variations of G' are important in achieving a good bond formation and a sufficient resistance to debonding, also the viscous modulus G" and his dynamic variation with frequency have a certain importance in determining the overall adhesive behavior in hard surface cleaning applications. Good adhesives have typically not only a high variation of G' across the considered frequencies but also there is often an even higher variation of G" which can get close or become greater than the value of G'.

Without wishing to be bound by theory, this can be interpreted as meaning that a high fraction of the energy applied for the debonding is dissipated within the adhesive (so it is not effective in causing the debonding) while this fact causes macroscopically the recording of a very high level of adhesive force.

Therefore good adhesives according to the present invention, show a crossover of the moduli G' and G" as a function of applied frequency, i.e. the frequency at which G" is equal to G' and goes over it, that occurs at frequencies which are below a certain limit. This phenomenon can be summarized by saying that in general the lower is the crossover frequency of an adhesive, the stronger is its adhesive strength.

Chemical Composition of the Adhesives

All compositions are expressed in wt % unless otherwise stated. In order to provide adhesive compositions which satisfy the requirements of the above rheological and physical characteristics of an adhesive the following formulation criteria can be used in addition. It should be noted that most compositions useful as adhesive have a substantially gel-like structure and are preferably gels. Gels are materials wherein a three dimensional network caused by physical or chemical links formed between the molecules. Gels commonly comprise a relatively large amount (30-80 wt %) of low molecular weight components like plasticizers and tackifiers which are often liquid at room temperature and an amount of a macromolecular or polymeric component which is generally less than 50% in weight of the gel.

The adhesive compositions to be used in the present invention preferably comprise:

From 0.5% to 49% %, preferably 5% to 40%, more preferably 7% to 35% by weight of a polymer or a mixture of polymers. Polymers which can be used for the present invention include natural and/or synthetic polymers, such as polyolefins and their copolymers (like e.g. polyethylene-vinyl acetate or polyethylene-acrylates copolymers); natural and synthetic rubbers (like polyisoprene, polybutadiene, butyl rubber and polyisobutylene, SBR, NBR etc.); thermoplastic block copolymers; polyurethanes; polyacrylates; polyesters; polyamides; polyvinyl-pyrrolidone and its copolymers; cellulose ethers and esters; natural gums and gelatins; alginates; starch and dextrin and their chemically modified derivatives. Particularly preferred in this application are Thermoplastic Block Elastomers and preferably Styrenic Block Copolymers like Styrene/Butadiene Block Copolymers, such as SBS and $(SB)_n$; Styrene/Isoprene Block Copolymers, such as SIS and $(SI)_n$, Styrene/Isoprene-Butadiene Block Copolymers such as SIBS; Styrene/Ethylene-Butylene Block Copolymers such as SEBS, and Styrene/Ethylene-Propylene Block Copolymers such as SEPS.

from 51% to 99.5% by weight, preferably 65% to 95%, more preferably 75% to 93% of a plasticizer or mixture of plasticizers which are preferably liquid at room temperature. As non limiting examples such plasticizers may be mineral and vegetable oils and their chemically modified derivatives such as epoxidized and polymerized oils; liquid polybutenes; liquid tackifiers such as liquid rosins and rosin esters; esters such as phtalates, citrates, phosphates; liquid polyesters; monocarboxilic fatty acids ($C_8$-$C_{22}$) and their derivatives; glycols and polyglycols. When hydrophilic polymers are used, said plasticizer can preferably be water, glycerol or glycerol esters.

from 0% to 48.5% by weight of a tackifier or mixture of tackifiers having a softening point of 160° C. or less, preferably of 125° C. or less and more preferably of 100° C. or less. As non limiting examples such tackifiers may be rosins and rosin esters; hydrocarbon resins; apliphatic resins; terpene and terpene-phenolic resins; aromatic and aromatically modified resins; synthetic $C_5$ resins and $C_5$-$C_9$ resins.

Preferably the adhesives to be used in the present invention are gels based on a hydrophobic polymer, otherwise called "oil gels".

Common additives known in the art as preservatives, antioxidants, anti UV, pigments, mineral fillers, rheology modifiers etc. can also be comprised in quantities up to 10% by weight each.

The Article

Articles according to the present invention are hard surface cleaning articles. For the purposes of the present invention hard surfaces are all common surfaces which are present inside or outside a house and which are not covered by fabrics, fibers or earth/grass and include floors, walls, doors, furniture, appliances and the like. Hard surfaces can be made with almost any material including resin, rubber, plastic, gres, marble, ceramics, porcelain, stone, metals (steel, aluminum), cement, bricks etc. More specifically the term hard surfaces, as defined in the present invention, include linoleum and resin surfaces and exclude carpet surfaces. In one embodiment the present invention relates to a hard surface cleaning article comprising an adhesive as described above. The article can be any known hard surface cleaning article, for example as those described in the prior art documents cited in the Background of Invention section of the present patent application.

The adhesive can be applied onto a portion of the article or be incorporated as a removable cartridge or sheet. In one embodiment the articles of the present invention are disposable sheets like wipes or pads which can be used directly by hand or preferably affixed onto the head of a mop such as, for example, those described in FIGS. 1 and 2 of patent application WO01/62132 so that once the sheet has been used it can be disposed and substituted with a new one. Alternatively the sheets can be attached to any type of implement which can aid wiping said sheet onto a surface including for example a cylindrical support which can be rolled onto a surface in order to clean it.

Sheets according to the present invention can be made according to all known designs and construction for cleaning sheets such as but not limiting to those mentioned in the already cited patent applications WO01/62132 by Procter & Gamble, WO 03/075735 by 3M and U.S. Pat. No. 6,550,092 by S. C. Johnson. Accordingly sheets comprise as a substrate any natural or synthetic fibrous material in the form of a woven fabric or a knit fabric, a non woven fabric, a laminate of a fabric and a polymeric film and combinations thereof. Methods of making such substrate are also well know in the art and are not described in detail herein. Preferably said substrate is a non woven fabric.

In general it is preferred that, upon use, the adhesive comprised in the articles of the present invention does not directly contact the hard surface, or at least does not contact it to a large extent, otherwise the article could stick to the hard surface and prevent gliding. It is in fact preferred that the adhesive is present in a recessed area of the article so that particles and hairs which need to be removed can get in contact with the adhesive while the article is quickly passed onto the surface to be cleaned and be trapped into it. It will be understood by the skilled man how important the Theological characteristics of the adhesive are in order to reach this result, in fact the adhesive may contact the particle or the hair for a fraction of second and only on a small portion of their surface, so it is crucial that the adhesive has the right "softness" features as described above in order to stick to the particle or hair and to trap it fast enough.

In the embodiment of the present invention wherein said article is a sheet, said sheet can have any configuration wherein the adhesive has a limited contact or no contact at all with the surface to be cleaned. In one embodiment the articles of the present invention are sheets having a three dimensional structure comprising valleys and peaks wherein the adhesive in the valleys only. In another embodiment the articles of the present invention are multi layer sheets comprising a layer of adhesive sandwiched between to fabric layers wherein one of the fabric layers have holes. In another embodiment the article of the present invention are sheets wherein a layer of adhesive is covered by a very light fibrous layer which is resilient enough to avoid, when in use, contact of the adhesive with the surface to be treated and wherein the space between the fibers of said fibrous layer is large enough to allow particles and hairs to reach the adhesive and be trapped into that. In another embodiment the articles of the present invention are sheets having non uniform thickness, comprising at least two raised areas and a recessed area, wherein the adhesive is applied onto the recessed area so that when the sheets is placed onto an hard surface only the raised portions will contact said surface.

In an alternative embodiment the article of the present invention is a brush for removing particles such as breadcrumbs, comprising means to pick up particles from a hard surface and means to collect them to an inner compartment of said article where an adhesive as described above is applied (preferably in the form of a disposable sheet) so that it can capture and retain said particles. In this embodiment the adhesive is preferably in a removable cartridge or sheet which, when exhausted, can be disposed with the trapped particles.

The articles of the present invention in all embodiments can also optionally comprise a cleaning lotion. In the case of sheets said sheets can be impregnated with a cleaning lotion, e.g. a wax, a solvent or a water based solution. Cleaning lotions, if present, preferably comprise a surfactant. Noticeably, the adhesives used in the present invention, due to their rheological properties, are able to retain particles also in the presence of cleaning lotions which reduce the tackiness of the adhesive surface.

While mentioned embodiments are just some of the many possible articles according to the present development, it will be appreciated that other possible embodiments may be derived from the prior art simply by introducing an adhesive as described herein in a prior art article wherein a generic adhesive was used. Many changes and modifications to the embodiments described so far may be made without departing from the present invention, for example by applying an article according to the present invention to any known cleaning implement such as a stick, a broom, a roll, a solid support having or not having an handle, or by making the article as a durable object rather than a disposable one.

EXAMPLE

Dry Adhesive Wipe

An adhesive wipe according to the present invention was made using a commercially available spundbond polypropylene nonwoven web having a basis weight of 20 grams per square meter, available from Avgol Corporation of Holon, Israel. The adhesive was applied into recessed areas of the nonwoven by an embossing and adhesive printing process as described in our patent U.S. Pat. No. 6,881,471. With reference to FIG. 3 of the cited patent, the substrate was embossed between male and female rolls 15 and 16. The rolls were engaged between 1 to 1.5 mm (0.04 to 0.06 inches). The embossed substrate, maintaining contact and registration with the male roll 15 rotated toward the glue transfer nip. The adhesive transfer nip 17 was a second female role having a 0.13 mm (0.0005 inch) FEP release coating and an embossed pattern that is in register and had 0.4 mm (0.016 inch) engagement with the male pattern role.

The adhesive was extruded onto the surface of the first adhesive application metering roll via a slot die 22. The application temperature for both the adhesive and the slot die was set at 130 C. The adhesive passed through metering rolls 22 and was transferred to the land areas of the adhesive transfer nip 17. Interaction between last metering roll 22 and embossing roll 17 was controlled to ensure adhesive application to the lands of the first embossing roll 17, without pressing the adhesive into the recesses or pockets between lands. The adhesive was applied on the second female roll at a basis weight of 2 grams per square meter. The combined adhesive/substrate was then pressed by a rubber covered niproll.

The applied adhesive is a hot melt supplied by National Starch under the trade name Softgel 555-8819. The G' at 0.1 rad/s and 25° C. of this adhesive material is 2700 Pa.

All documents cited in the Detailed Description of the Invention are, in relevant part, incorporated herein by reference; the citation of any document is not to be construed as an admission that it is prior art with respect to the present invention. To the extent that any meaning or definition of a term in this written document conflicts with any meaning or definition of the term in a document incorporated by reference, the meaning or definition assigned to the term in this written document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A hard surface cleaning article comprising sheet further comprising an adhesive having:
  a. An elastic modulus $G'_{25}$ measured at 25° C. and 0.1 rad/s below 15000 Pa, and
  b. An elastic modulus percent increase $\Delta G'_{25}$ measured between 0.1 and 100 rad/s of more than 100%;
  wherein said adhesive is an oil gel and comprises from about 75% to 95% by weight of a plasticizer selected from the group consisting of vegetable oils, epoxidized and polymerized derivatives of vegetable oils, monocarboxylic fatty acids ($C_8$-$C_{22}$), and their derivatives and from about 1% to about 48.5% by weight of a tackifier selected from the group consisting of hydrocarbon resins; aliphatic resins; terpene and terpene-phenolic resins; aromatic and aromatically modified resins; synthetic $C_5$ resins, $C_5$-$C_9$ resins and mixtures thereof having a softening point of 160° C. or less, wherein said adhesive is present in a recessed area of said article and said adhesive does not directly contact the surface to be cleaned, wherein the sheet comprises at least three layers comprising a layer of said adhesive sandwiched between fabric layers, wherein at least one of the fabric layers has holes.

2. A hard surface cleaning article according to claim 1, wherein said adhesive has a crossover frequency of less than 1000 rad/s.

3. A hard surface cleaning article according to claim 1, wherein said adhesive is a hot melt adhesive.

4. A hard surface cleaning article according to claim 1, wherein said adhesive comprises from 0.5% to 49% by weight of a polymer or mixture of polymers.

5. A hard surface cleaning article according to claim 1, wherein said sheet comprises a polymeric film.

6. A hard surface cleaning article according to claim 1, wherein said sheet comprises a nonwoven.

7. A hard surface cleaning article according to claim 6 wherein said sheet comprises peaks and valleys.

8. A hard surface cleaning article comprising a sheet and further comprising an adhesive disposed on said sheet, said adhesive having:
  an oil gel and comprising from about 75% to 95% by weight of a plasticizer selected from the group consisting of vegetable oils, epoxidized and polymerized derivatives of vegetable oils, monocarboxylic fatty acids ($C_8$-$C_{22}$), and their derivatives and from about 1% to about 48.5% by weight of a tackifier selected from the group consisting of hydrocarbon resins; aliphatic resins; terpene and terpene-phenolic resins; aromatic and aromatically modified resins; synthetic $C_5$ resins, $C_5$-$C_9$ resins and mixtures thereof having a softening point of 160° C. or less, wherein said adhesive is present in a recessed area of said article and said adhesive does not directly contact the surface to be cleaned, wherein the sheet comprises at least three layers comprising a layer of said adhesive sandwiched between fabric layers.

9. A hard surface cleaning article according to claim 8 wherein said sheet comprises a nonwoven.

10. A hard surface cleaning article according to claim 8 wherein said sheet comprises a nonwoven having peaks and valleys and said adhesive is disposed only in said valleys.

11. A hard surface cleaning article according to claim 8 wherein said adhesive has a modulus $G'_{25}$ measured at 25° C. and 0.1 rad/s below 15000 Pa.

12. A hard surface cleaning article according to claim 8 wherein sais adhesive has an elastic modulus percent increase $\Delta G'_{25}$ measured between 0.1 and 100 rad/s of more than 100%.

13. A hard surface cleaning article comprising a sheet and further comprising an adhesive disposed on said sheet, said adhesive having:

an oil gel and comprising from about 75% to 95% by weight of a plasticizer selected from the group consisting of vegetable oils, epoxidized and polymerized derivatives of vegetable oils, monocarboxylic fatty acids ($C_8$-$C_{22}$), and their derivatives and from about 1% to about 48.5% by weight of a tackifier selected from the group consisting of hydrocarbon resins; aliphatic resins; terpene and terpene-phenolic resins; aromatic and aromatically modified resins; synthetic $C_5$ resins, $C_5$-$C_9$ resins and mixtures thereof having a softening point of 160° C. or less, wherein said adhesive is present in a recessed area of said article and said adhesive does not directly contact the surface to be cleaned, wherein the sheet comprises at least three layers comprising a layer of said adhesive sandwiched between fabric layers, wherein said sheet comprises at least one of a nonwoven and a polymeric film.

14. A hard surface cleaning article according to claim 13 wherein said adhesive is a hot melt adhesive.

15. A hard surface cleaning article according to claim 13, wherein said adhesive comprises from 0.5% to 49% by weight of a polymer or mixture of polymers.

16. A hard surface cleaning article according to claim 13 further comprising a cleaning lotion.

17. A hard surface cleaning article according to claim 13 further comprising a wax.

\* \* \* \* \*